United States Patent [19]

Howkins

[11] Patent Number: 4,788,557

[45] Date of Patent: Nov. 29, 1988

[54] INK JET METHOD AND APPARATUS FOR REDUCING CROSS TALK

[75] Inventor: Stuart Howkins, Ridgefield, Conn.

[73] Assignee: Dataproducts Corporation, Woodland Hills, Calif.

[21] Appl. No.: 23,707

[22] Filed: Mar. 9, 1987

[51] Int. Cl.$^4$ .............................................. G01D 15/16

[52] U.S. Cl. ................................ 346/1.1; 346/140 R; 310/326; 310/348

[58] Field of Search ................. 346/140, 1.1; 310/326, 310/348

[56] References Cited

U.S. PATENT DOCUMENTS

| | | | |
|---|---|---|---|
| 3,452,360 | 6/1969 | Williamson | 346/140 |
| 3,927,410 | 12/1975 | Pimbley | 346/140 |
| 4,018,383 | 4/1977 | Paton | 346/75 X |
| 4,290,074 | 9/1981 | Royer | 346/75 |
| 4,439,780 | 3/1984 | De Young | 346/140 |

*Primary Examiner*—Joseph W. Hartary
*Attorney, Agent, or Firm*—Woodcock Washburn Kurtz Mackiewicz & Norris

[57] ABSTRACT

An impulse ink jet apparatus includes a plurality of lengthwise expandable piezoelectric transducers, each of the transducers varying the volume of a compression chamber in order to eject droplets of ink therefrom. Mechanical cross talk propagating along a support structure for the transducers is minimized by effectively decoupling each transducer from its neighbors. In one approach, the support structure rigidly supports each transducer at displacement nodal points thereof, while in another approach the lengths of the transducers are uniquely varied with respect to their neighbors.

14 Claims, 2 Drawing Sheets

INK JET METHOD AND APPARATUS FOR REDUCING CROSS TALK

BACKGROUND OF THE INVENTION

This invention relates generally to ink jet arrays including a plurality of ink jet channels wherein each channel includes a chamber, an inlet to the chamber, and orifice from the chamber, and transducer means coupled to the chamber for ejecting droplets of ink from the chamber as a function of the state of energization of the transducer means. More specifically, this invention relates to a method and apparatus for reducing cross talk in such ink jet arrays.

In liquid droplet ejecting systems of the drop-on-demand type, such as impulse ink jet printers, a piezoceramic transducer is used to cause expulsion of ink as droplets from a small nozzle or jet. An array of such jets is often utilized in high-speed, high-resolution printers where, as is well-known, the printing rate increases as the number of jets is increased, but decreases as the degree of resolution required is increased.

High speed, high resolution printing therefrom requires large members of jets in an array. For such large arrays it is important for various reasons to make the array as compact as possible by minimizing the spacing between jets. Such reasons include, but are not limited to, minimizing "over-travel" (i.e., the amount of time spent by jets beyond the printing region during a scan of the paper), and reducing the overall size and mass of the printhead to reduce the size and cost of the printer.

One suitable such printer is described in U.S. Pat. No. 4,459,601, issued July 10, 1984 to Stuart D. Howkins, assigned to the assignee of the present invention and incorporated herein by reference. In that arrangement, an ink jet apparatus of the demand or impulse type comprises a chamber and an orifice from which droplets of ink are ejected in response to the state of energization of a transducer which communicates with the chamber through a foot forming a movable wall. The transducer expands and contracts, in a direction having at least one component extending parallel with the direction of droplet ejection through the orifice, and is elongated in such direction, the electric field resulting from the energizing voltage being applied transverse to the axis of the elongation.

One problem common to all high-speed, high-resolution, drop-on-demand ink jet printers occurs because the jets of an array are spaced very close to one another. That is, the response of one jet in an array to its drive voltage can be affected by the simultaneously application of a drive voltage to another nearby jet. This can result in a phenomenon, known in the art as "mechanical cross talk", where pressure waves are transmitted through the solid structure in which the transducers are mounted, through the ink, and through the solid material in which the jets are formed, or in another phenomenon, known in the art as "electrical cross talk", where the relatively large drive voltages necessary for substantial displacement of transducers utilized in the prior art cause the simultaneous pulsing of an inappropriate transducer.

While the risk of electrical cross talk between ink jets in an array utilizing the teaching of U.S. Pat. No. 4,459,601 as discussed above will be minimized, the risk of mechanical cross talk remains. One approach for eliminating such mechanical cross talk in drop-on-demand ink jet printers, disclosed in U.S. Pat. No. 4,381,515, issued Apr. 26, 1983 to Lee L. Bain, induces electrical cross talk using passive elements which effectively neutralizes the mechanical cross talk. A resistor is first placed in series with each transducer and its associated electricl driver. Thereafter, one compensating resistor per channel is connected at one end between the series resistor and transducer of a respective channel and connected at the opposite end between the series resistor and transducer of an adjacent channel. As is apparent, such an arrangement would unnecessarily complicate the manufacturer of drop-on-demand ink jet printers having a multitude of channels, thereby also increasing their cost.

Another approach which alleviates the problem of mechanical cross talk is discussed in U.S. Pat. No. 4,439,780, issued Mar. 27, 1984 to Thomas W. DeYoung and Viacheslav B. Maltsev, assigned to the assignee of the present invention and incorporated herein by reference. In that arrangement, an ink jet array comprises a plurality of elongated transducers coupled to a plurality of ink jet chambers, the transducers being supported only at their longitudinal extremities. The support at the extremity remote from each chamber is provided such that no longitudinal motion along the axis of the longation of the transducers occurs, while the other extremity includes bearing means which substantially precludes lateral movement of the transducers transverse to their axis of elongation but permit the longitudinal movement thereof along the axis, thus minimizing mechanical cross talk between ink jets within the array. Other characteristic problems which are encountered in the implementation of high-speed, high-resolution impulse ink jet printers do not impact so much upon their operation, but indeed impact upon their fabrication. For example, the relatively small sizes of component parts used in densely packed arrays make them difficult to handle. An easily fabricated ink jet array is, therefore, preferred.

One earlier approach to the above-described problem is disclosed in U.S. Pat. No. 4,072,959, issued Feb. 7, 1978 to Rune Elmqvist. As discussed therein, a recorder operating with drops of liquid includes a comb-shaped piezoelectric transducer arranged such that individual teeth of the comb are associated respectively to a densely-packed array of ink jet chambers. The teeth, actually a series of elongated transducers, are energized by electrodes which apply a field transverse to the access of elongation. Each of the transducers is immersed in a common reservoir such that energization of one transducer associated with one chamber may produced cross-talk with respect to an adjacent chamber or chambers. In other words, there is no fluidic isolation from chamber to chamber between the various transducers or more accurately, segments of the common transducer. In addition to such cross talk, the construction shown in the Elmqvist patent poses a requirement for nonconductive ink.

As pointed out in U.S. Pat. No. 4,564,851, issued Jan. 14, 1986 to Kenth Nilsson and Jan Bolmgren, another problem with the design of the Elmqvist patent is that the clamping of the comb must occur with extreme precision. Since the thickness of the comb only amounts to a few tenths of a millimeter, a displacement between the spacer piece and the clamp of the same order of magnitude will lead to considerable changes in the flexural forces. The flexural lengths of the transducers in the two twist directions become different as a consequence, thus leading to imprecise writing. In accordance with the teachings of U.S. Pat. No. 4,564,851, therefore, individual transducers are formed by teeth of a comb-like piezoplate comprising a bilaminar plate of a layer of piezoceramic material and a carrier layer, the piezoceramic layer being provided with a reinforcing layer in the area of a spine of the comb shared by all teeth. Unlike the Elmqvist patent, a far simpler arrangement can be utilized as a clamp for the comb without making demands on the tolerances, since the precise length of the oscillatory parts of the transducer is defined by the front edge of the reinforcement layer.

In addition to the problems of cross talk addressed in the foregoing U.S. Pat. Nos. 4,072,959 and 4,562,851, it should be noted that both such patents incorporate transducers which utilize flexural motion to eject droplets of ink on demand. This flexural motion is less desireable than motion provided by transducers which are elongated in the direction of expansion and contraction since displacement can be made large simply by increasing the length of the transducer, with such increase in length not causing any decrease in the density of an array thusly formed. Moreover, large displacements can be achieved without applying large electrical voltages which could result in electrical cross talk. It is desireable, to limit the length of the transducer so as to limit the undesirable flexural motion which can result when the transducer becomes too long and thin, and achieve the proper length mode resonance, those of the Helmholtz frequency as described in the above reference U.S. Pat. No. 4,459,601.

Other prior art approaches which have sought to minimize mechanical cross talk mechanically decouple the transducer means. For example, U.S. Pat. No. 4,390,886, issued June 28, 1983 to S. Bertil Sultan, discloses an ink jet printer having a plurality of channels, each of the channels including a transducer mounted within its own housing. Rectangular recessed portions are formed in the housings to define slots between adjacent ink jet modules so as to reduce coupling of cross talk therebetween. Another approach, utilized in continuous stream ink jet printers, is disclosed in U.S. Pat. No. 4,095,232, issued June 13, 1978 to Charles L. Cha, and in U.S. Pat. Re. No. 31,358, reissued Aug. 23, 1983 to Cha et al. Those patents teach a stimulator which includes a pair of piezoelectric crystals vibrating in phase and which are mounted on opposite sides of a mounting plate which is coincident with a nodal plane. A reaction mass is positioned at the opposite end of the stimulator from a stimulation member which is coupled to the fluid. Neither of those patents, however, address the problems of mechanical cross talk in drop-on-demand ink jet printers.

SUMMARY OF THE INVENTION

Accordingly, it is a general object of the present invention to provide a multi-channel, high-density array of ink jets. More specifically, it is an object of the invention to provide a multi-channel, high-density array of ink jets which may be readily fabricated.

It is another object of this invention to provide a multi-channel, high-density array of ink jets whih fluidically isolates each of the channels thereby minimizing mechanical cross-talk.

It is a further object of the present invention to provide an ink jet apparatus in which the mechanical energy transmitted by one channel is decoupled from nearby channels, thereby further minimizing mechanical cross talk.

Briefly, these and other objects of the present invention are accomplished by an ink jet apparatus having a plurality of channels, wherein each of the channels includes a chamber, an inlet opening to the chamber, and an ink droplet ejecting orifice. A plurality of lengthwise-expanding transducers, each of which is coupled to a respective chamber to vary its volume for ejection of a droplet therefrom, are mounted upon a platform in a manner consistent with the aforedescribed U.S. Pat. Nos. 4,439,780, and 4,459,601. In accordance with one important aspect of the present invention, however, each of the transducers are mechanically decoupled from adjacent transducers in order to minimize cross talk propagating through the platform to which the transducers are mounted. According to one embodiment of the present invention, the transducers, comprising an active length and a compensation length, are rigidly supported at displacement nodal points thereof upon the platform such that the compensation length resonates at substantially the same frequency of its corresponding activated working length. In accordance with other embodiments of the present invention, the length of each transducer is uniquely varied with respect to the lengths of its adjacent transducers. As a result, energy caused by the activation of one transducer and propagated through the support structure is unlikely to be coupled to adjacent transducers, thereby minimizing cross talk.

Other objects, advantages and novel features of this invention will become apparent from the following detailed description of the invention when considered in conjunction with the accompanying drawings wherein:

DETAILED DESCRIPTION OF THE INVENTION

Figure 1:
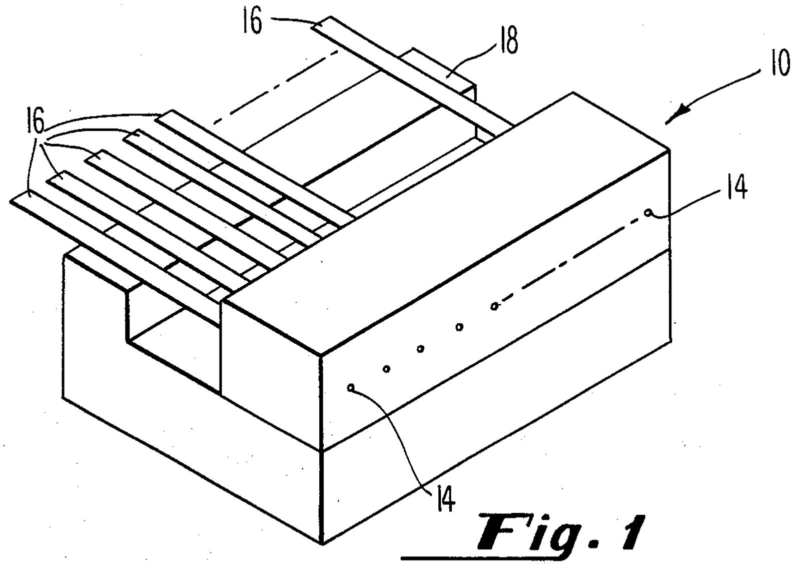
FIG. 1 is an isometric view of an ink jet apparatus according to the present invention.
Figure 2:
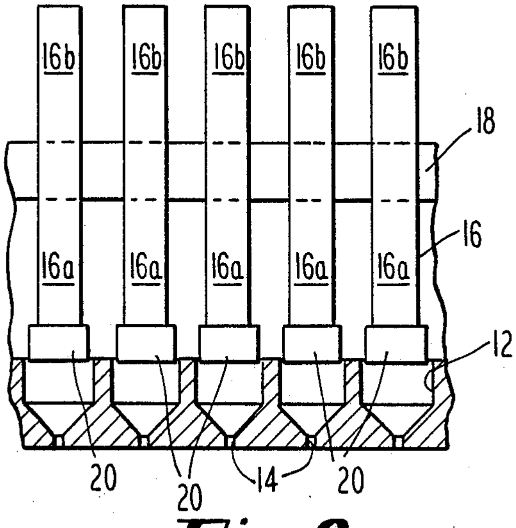
FIG. 2 is a plan view, partly in section, of the ink jet apparatus shown in FIG. 1 with details illustrating transducer mounting means according to one embodiment of the present invention.

Referring now to the drawings, wherein like characters designate like or corresponding parts throughout the several views, there is shown in FIGS. 1 and 2 a multi-channel impulse or drop-on-demand ink jet print head 10, wherein each of the channels includes a chamber 12, an inlet opening to the chamber, and an ink droplet ejecting orifice 14. A plurality of transducers 16 are mounted within print head 10 to vary the volume of the chambers 12, each of the transducers 16 being adapted to expand and contract along an axis of elongation in response to an electric field substantially transverse to the axis of elongation. That is, when an electric field is applied to the transducers 16, the transducers 16 contract along the axis so as to expand the chambers 12 and fill those chambers 12 through their inlets, or the transducers 16 expand along the axis so as to contract the chambers 12 in the absence of an electric field applied to the transducers 16 so as to eject a droplet from the orifices 14. Further details relating to the supply of ink to the print head 10, as well as details pertaining to the mounting of the transducers 16 may be had with reference to the aforedescribed U.S. Pat. Nos. 4,439,780, and 4,459,601.

A recurring problem which has been experienced in most prior art ink jet printers, as well as the ink jet printing apparatus disclosed in the aforedescribed U.S. Pat. Nos. 4,439,780, and 4,459,601, is that of mechanical cross talk. When one transducer 16 is energized to eject ink from its respective orifice 14, energy is coupled via a sympathetic resonance of each transducer 16 in turn in response to its neighbor. The whole system thus behaves like an acoustic delay line, and propagation velocities have been measured which are much lower than the shear modulus sonic velocity in the member 18 supporting the transducer 16. One possibility of reducing or eliminating such mechanical cross talk would be to cut slots in the transducer mounting platform 18 in order to interfere with the transmission path. Another similar approach used in the past has been to decouple the individual transducers 16. Both techniques, however, suffer from two disadvantages. Deep cuts in the transducer mounting platform 18 would reduce its stiffness, thereby making the transducers 16 to behave more like a "free-free" rod which has a detrimental affect upon the ink performance. Similarly, decoupling the transducer 16 by increasing the compliance of the bond (that is, by making a smaller bond surface or a thicker, softer bond line) has the same detrimental effect. Moreover, deep cuts would be difficult and expensive to make in a manufacturing operation.

Referring again to FIGS. 1 and 2, however, it has been determined that by mounting the transducer 16 to the transducer mounting platform 18 at a point close to the center of the transducers 16 (instead of at their extremity remote from the chamber 12) coupling of energy due to the energization of one transducer 16 to its neighboring transducers 16 is reduced almost to zero. Each transducer 16, according to a first embodiment of the present invention, is comprised of an active length **16*a* and a passive length 16*b*, such that the overall length of the transducer 16 is nearly doubled over that disclosed and claimed in U.S. Pat. Nos. 4,439,780, and 4,459,601, in order to maintain an optimum resonant frequency which would result in no change in performance. The extra or compensation length 16*b* of each transducer 16 would, in affect, upon activation of its corresponding working length 16*a* be ringing at the same frequency as the working length 16*a* but would be 180° out of phase, thus cancelling the reaction forces upon the support structure 18. It should be noted at this juncture, however, that since the working length 16*a* of each tranducer is loaded by the "potted" foot and the fluidics formed by the chambers 12, the compensation lengths 16*b* of such transducers 16 must be slightly longer than their corresponding working lengths 16*a* in order to achieve maximum cross talk cancellation. As is apparent from the foregoing description of the embodiment shown in FIGS. 1 and 2, however, one disadvantage of such an embodiment would be that it requires a doubling of the piezoceramic necessary for the manufacture of the transducers 16**, as well as would take up more space in the transducer housing, thereby, increasing manufacturing costs of material and the production processes.

Figure 3:
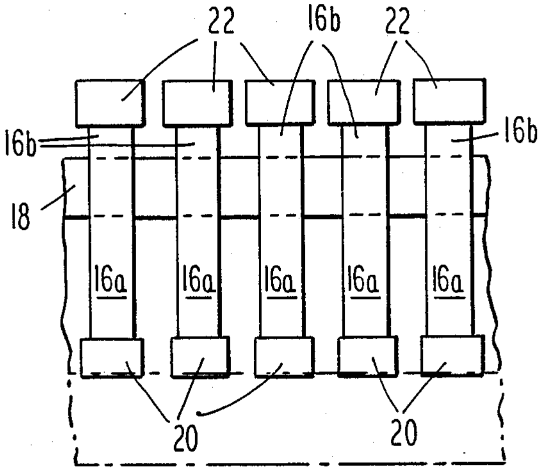
FIG. 3 illustrates a second embodiment of the transducer mounting means according to the present invention.
Figure 4:
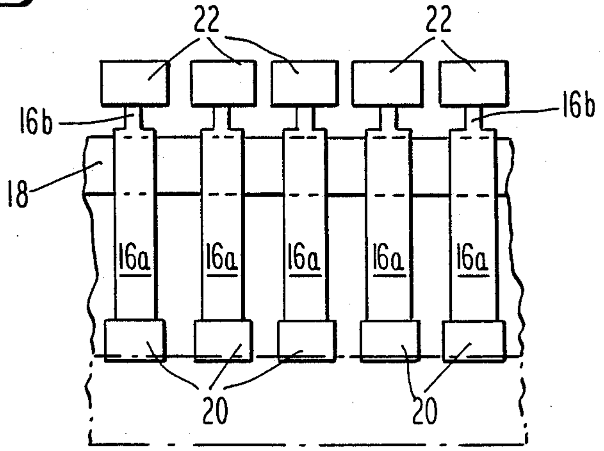
FIG. 4 illustrates a third embodiment of the transducer mounting means according to the present invention.

Referring now to FIG. 3, a second embodiment which incorporates the principles of the present invention yet reduces the lengths of each transducer 16 is shown. Like the embodiment shown in FIGS. 1 and 2, the transducers 16 of FIG. 3 include a working length **16*a* and a compensation length 16*b*. However, the compensation lengths 16*b* shown in FIG. 3 may be shortened by mounting to each transducer 16 at its end remote from the chambers 12 (not shown in FIG. 3 for clarity) a reaction mass 22. In accordance with one important aspect of the present invention, the amount of mass of each reaction mass 22 would be chosen so that the compensation length 16*b* with its attached reaction mass 22 would resonate at a frequency substantially equal to that of the corresponding loaded working length 16*a*. An even further reduction in the size of the compensation lengths 16*b* is possible by attaching reaction masses 22 to compensation lengths 16*b* having reduced cross sectional areas as shown in FIG. 4. In either case, however, it should be noted that the size of the reaction masses 22 as well as any reduction in the cross-sectional area of the compensation lengths 16*b* should be carefully selected in order that the compensation lengths 16*b* with their reaction masses 22 resonate at substantially the same frequency as their corresponding loaded working lengths 16*a***.

Figure 5:
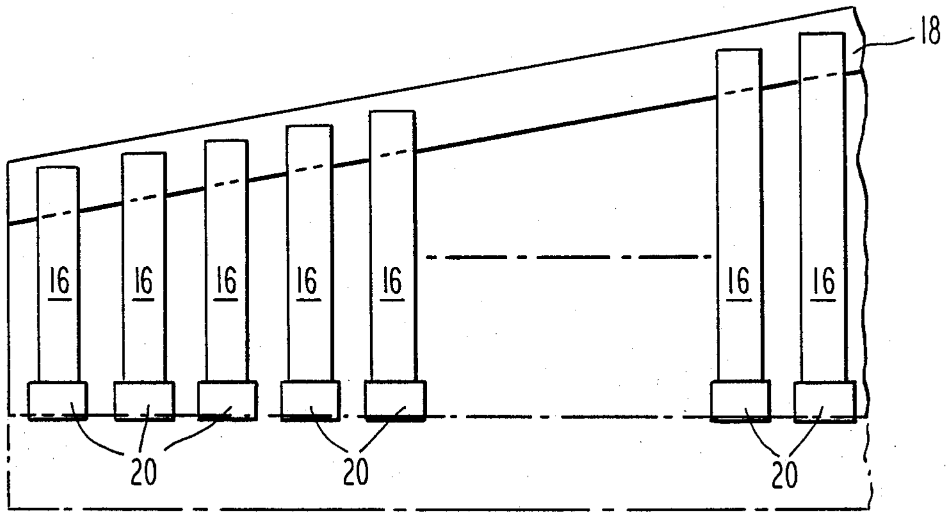
FIG. 5 illustrates a fourth embodiment of the transducer mounting means according to the present invention.
Figure 6:
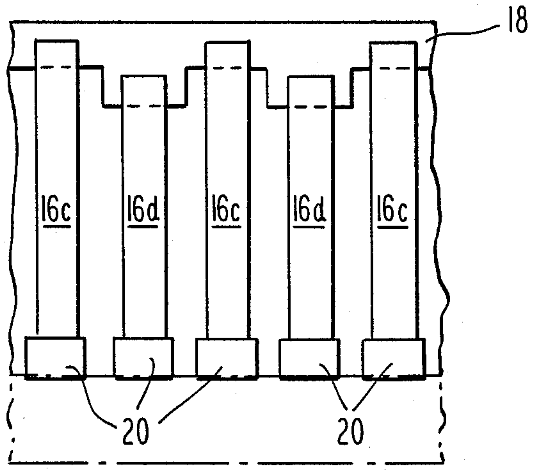
FIG. 6 illustrates a fifth embodiment of the transducer mounting means according to the present invention.
Figure 7:
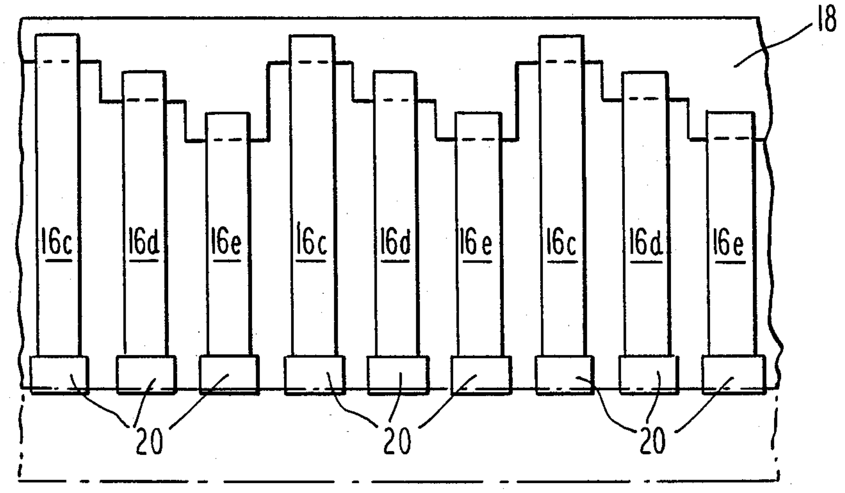
FIG. 7 illustrates a sixth embodiment of the transducer mounting means according to the present invention.

Sympathetic resonances in the support structure 18 for the transducers 16 may also be decoupled by varying the lengths of adjacent transducers 16 as shown in the embodiments of FIGS. 5–7. Referring first to FIG. 5, a plurality of transducers 16 of uniquely different lengths are mounted to the support structure 18 and loaded by respective feet 20 "potted" within the fluidic portion. Energization of one transducer 16 in this embodiment, therefore, does not create sympathetic resonances in its neighboring transducer 16 since each transducer 16 has a slightly different resonant frequency. It should be noted, however, that the lengths of each transducer 16 should be carefully selected so that harmonic resonances are not created.

As is apparent from the foregoing description of the embodiment shown in FIG. 5, an ink jet apparatus incorporating the "xylophone" design shown therein suffers from the same disadvantage as the embodiment shown in FIGS. 1 and 2. That is, in an ink jet apparatus which include a large plurality of transducers 16, the length of the longest transducer 16 would have to be accommodated, thereby increasing manufacturing costs. However, similar attenuation of the delay line propagation of energy can be accomplished by merely selecting two or more lengths of transducers 16 as shown in FIGS. 6 and 7. Referring now to FIG. 6, transducers **16*c* of a first length are mounted to the support structure 18 and "potted" within the forward fluidic portion. A second plurality of transducers 16*d*, shorter than the transducers 16*c*, are mounted in an alternating fashion between the transducers 16*c*. As a result, the mounting arrangement of the intervening transducers 16*d* act to prevent propagation of energy from an energized transducer 16*c* to its next adjacent transducer 16***d*. Similarly, three pluralities of transducers having different lengths 16*c*, 16*d*, and 16*e* may be mounted in a repetitive fashion as shown in FIG. 7.

The transducers 16 which have been shown and described herein are elongated and expand and contract along the axis of the elongation in response to energization by the application of voltage transverse to the axis of elongation. Details concerning such transducers 16 are set forth in U.S. application Ser. No. 576,582 filed Feb. 3, 1984 which is incorporated herein by reference. It will, of course, be appreciated that other transducer configurations may be utilized to generate predetermined patterns through a plurality of orifices in accordance with this invention. Details of the manner in which the transducers 16 may be manufactured and mounted in a single 24 operation are disclosed in U.S. patent application Ser. No. 902,473, filed Aug. 29, 1986, assigned to the assignee of the present invention, and incorporated herein by reference. Furthermore, the reaction masses 22 may be manufactured and assembled to their respective transducers 16 in accordance with the teachings of U.S. patent application Ser. No. 901,886, filed Aug. 29, 1986, which is also assigned to the assignee of the present invention and incorporated herein by reference.

Although particular embodiments of the invention have been shown and described and various modifications suggested, it will be appreciated that other embodiments and modifications which fall within the true spirit and scope of the invention as set forth in the appended claims will occur to those of ordinary skill in the art.

What is claimed is:

1. An ink jet apparatus of the drop-on-demand type, comprising:

an array of variable volume chambers, each of said chambers including an inlet for receiving a supply of ink and an ink droplet ejection orifice;

a plurality of transducers, each one of said plurality of transducers being adapted to expand and contract along an axis of elongation in response to an electric field that is applied to said transducer substantially transverse to said axis of elongation;

coupling means being each one of said array of chambers and a respective one of said plurality of transducers for expanding and contracting the volume of each said chamber to eject droplets of ink on demand through its associated orifice, wherein said volume expansion and contraction occurs in response to the expansion and contraction of said respective transducer along said axis of elongation;

transducer mounting means for rigidly supporting said transducers at displacement nodal points thereof; and means for applying an electric field to each one of said plurality of transducers such that said transducer contracts along its axis of elongation so as to expand its respective chamber and fill said chamber with ink from said supply through its inlet, and such that said transducers expands along its axis of elongation so as to contract its respective chamber in the absence of said electric field being applied to said transducer so as to eject a droplet from said orifice associated with said transducer on demand.

2. Apparatus according to claim 1, wherein said transducers each comprise a working length and a compensation length.

3. Apparatus according to claim 2, wherein said working length and compensation length are separated by said nodal points.

4. Apparatus according to claim 3, wherein said nodal points each comprise a point substantially midway between the ends of said transducer.

5. Apparatus according to claim 1, wherein said working length and said compensation length have substantially equivalent resonant frequencies.

6. Apparatus according to claim 2, wherein said working length is substantially longer than said compensation length.

7. Apparatus according to claim 6, further comprising:

a reaction mass attached to a distal portion of each of said compensation lengths said reaction masses and their associated compensation lengths, being adapted to have a resonant frequency substantially equivalent to said working lengths.

8. A method of reducing mechanical cross talk in ink jet apparatus including a print head, a plurality of transducers, attached to the print head, each of which is respectively coupled to an individual ink jet chamber within an array of such ink jet chambers that is formed within the print head, each of the chambers including an inlet for receiving a supply of ink and an ink droplet ejection orifice through which droplets of ink are ejected on demand in response to the volume of the chamber being varied by its respective transducer, wherein the method comprises the step of:

rigidly supporting each said transducer at a preselected point along its length to to decouple mechanical energy that is produced at resonant frequencies of said transducer from said print head, thereby preventing an activation of one said transducer from causing another said transducer to vary the volume of its respective chamber to eject a droplet of ink, when not demanded, through said orifice.

9. A method according to claim 8, wherein said supporting step comprises:

bonding said transducers at displacement nodal points thereof to a rigid body.

10. A method according to claim 9, further comprising:

forming a working length and a compensation length for each of said transducers, said working length and said compensation length being separated by said nodal point.

11. A method according to claim 10, wherein said working length formed is substantially longer than its associated compensation length.

12. A method according to claim 11, further comprising:

attaching a reaction mass to a distal portion of each of said compensation lengths, wherein said reaction masses and their associated compensation length resonate at a frequency substantially equivalent to said the resonant frequency of said working lengths.

13. A method according to claim 12, further comprising:

reducing the cross-sectional area of said compensation length between said rigid body and said reaction mass.

14. A method according to claim 10, further comprising:

uniquely varying the lengths of said working lengths; and detaching said compensation lengths to thereby produce a plurality of transducers with differing resonant frequencies.

* * * * *

UNITED STATES PATENT AND TRADEMARK OFFICE

CERTIFICATE OF CORRECTION

PATENT NO. : 4,788,557

DATED : November 29, 1988

INVENTOR(S) : Howkins

It is certified that error appears in the above-identified patent and that said Letters Patent is hereby corrected as shown below:

Column 7, line 43, please change the word "being" to --between--.

Signed and Sealed this

Eleventh Day of April, 1989

*Attest:*

DONALD J. QUIGG

*Attesting Officer*

*Commissioner of Patents and Trademarks*